United States Patent [19]
Chai

[11] Patent Number: 6,062,329
[45] Date of Patent: May 16, 2000

[54] PEDAL BICYCLE HAVING AN AUXILIARY POWER MEANS

[76] Inventor: Kaoteh Chai, Room 1601, 47-51, Shang Tung Street, Mongkok, Kowloon, The Hong Kong Special Administrative Region of the People's Republic of China

[21] Appl. No.: 08/930,023
[22] PCT Filed: Apr. 3, 1995
[86] PCT No.: PCT/CN95/00022
§ 371 Date: Jan. 2, 1998
§ 102(e) Date: Jan. 2, 1998
[87] PCT Pub. No.: WO96/30249
PCT Pub. Date: Oct. 3, 1996

[30] Foreign Application Priority Data

Mar. 27, 1995 [CN] China .............................. 95 2 06451

[51] Int. Cl.[7] .............................. B62K 11/00; B62M 7/00
[52] U.S. Cl. .......................................... 180/205; 180/220
[58] Field of Search ................................ 180/205, 207, 180/212, 219, 206, 220, 54.1

[56] References Cited

U.S. PATENT DOCUMENTS

| | | | |
|---|---|---|---|
| 2,027,941 | 1/1936 | Waterhouse | 192/103 |
| 2,560,991 | 7/1951 | Schuricht | 180/205 |
| 2,575,873 | 11/1951 | Henney | 180/205 |
| 3,280,932 | 10/1966 | Moulton | 180/205 |
| 3,759,339 | 9/1973 | Farrow | 180/216 |
| 4,397,369 | 8/1983 | Read | 180/205 |
| 4,637,274 | 1/1987 | Goldenfeld | 74/625 |
| 5,076,386 | 12/1991 | Ferneding | 180/205 |
| 5,908,078 | 6/1999 | Creixell | 180/219 |

*Primary Examiner*—Paul N. Dickson
*Assistant Examiner*—Bridget Avery
*Attorney, Agent, or Firm*—Garrison, Morris & Haight, PLLC

[57] ABSTRACT

A pedal bicycle is provided which includes an auxiliary power source such as an internal combustion engine or a DC electric motor. The bicycle further includes a clutch-transmission having an input shaft connected to the auxiliary power source and an output shaft. A bicycle chain wheel is mounted on the pedal assembly of the bicycle and is connected to a bicycle free-wheel mounted on the hub of the rear wheel. The bicycle further includes a second chain wheel mounted on the output shaft of the clutch-transmission for rotation therewith and a second free-wheel connected to the second chain wheel by a second chain. The second free-wheel may be mounted on the hub of the rear or front wheel of the bicycle depending upon the mounting location of the auxiliary power source and the clutch-transmission. The bicycle free-wheel and the second free-wheel are driven in the same direction.

8 Claims, 7 Drawing Sheets

PEDAL BICYCLE HAVING AN AUXILIARY POWER MEANS

FIELD OF THE INVENTION

The present invention relates to a pedal bicycle having an auxiliary power means (such as a small internal combustion engine, or a DC electric motor), especially to a pedal bicycle having an auxiliary power means which is provided with two free-wheels and two driving chains, the two free-wheels being driven through respective chains by power from auxiliary power means and rider's pedaling separately.

BACKGROUND OF THE INVENTION

In the known pedal bicycle with auxiliary power means, the auxiliary power means is pivotally mounted on the bicycle frame and a friction wheel is installed at the end of the power output shaft of the auxiliary power means. The boosting effect is then achieved through the friction drive between the friction wheel and the bicycle tire when the wheel is rolling. However, for this kind of friction drive between the friction wheel and the tire, the change of air pressure within the tire often makes the transmission efficiency vary greatly. In particular, it is impossible to ensure the auxiliary power means to work at the rotating speed under the optimum operating condition since the wheel is driven directly by the auxiliary power means. As a result, the auxiliary power means consumes energy excessively. It becomes more obvious in particular when the auxiliary power means is a small gasoline engine. As for the case when clay and gravel are stacked on the tire, the friction transmission efficiency is affected further. The auxiliary power means even can't work normally. Also, a very complicated clutch-transmission and an operating device manipulating the clutch-transmission are used in the prior art for transferring the power from the auxiliary power means to the driving chain in order to boost the driving chain which is driven by the rider's pedaling. As the designed strength of the driving chain is defined according to the force of manpower pedaling, if on the driving chain a driving force is added besides, the chain will be overloaded. Hence, it is easy to be worn or broken. Moreover, in known bicycles using one driving chain, the structure of clutch-transmission is very complicated. Therefore, not only the possibility of failure becomes larger, particularly, the expensive price can't be accepted by the ordinary consumers.

SUMMARY OF THE INVENTION

Therefore, an object of the present invention is to provide a pedal bicycle with auxiliary power means, having simple structure, no clutch operating device, high transmission efficiency and with low energy consumption (such as fuel consumption). The pedal bicycle with auxiliary power means can be operated very simply and its price is relatively cheap.

With the above-mentioned aims, the present invention provides a pedal bicycle having an auxiliary power means, including a bicycle, an auxiliary power means, a clutch-transmission and the controller of the auxiliary power means connected to a grip of the bicycle through a cable, in which a second free-wheel being mounted on the hub of the bicycle wheel and having the same driving direction as the free-wheel driven by the bicycle pedaling, the second free-wheel being connected with the second chain wheel mounted on the output shaft of the clutch-transmission by a second chain, whereas the second chain makes chain transmission between the second chain wheel and the second free-wheel. The clutch-transmission is mounted on the auxiliary power means and the output shaft of the auxiliary power means is connected to the input shaft of the clutch-transmission; the auxiliary power means together with the clutch-transmission being secured to the bicycle frame.

In a preferred embodiment, the clutch-transmission includes a supporting disk for centrifugal blocks installed within the case, a driven disk, an input shaft, an output shaft and a pair of speed reducing gears, i.e., a small gear and a large gear. The supporting disk for centrifugal blocks is connected to the input shaft securely, and the centrifugal blocks are evenly mounted on the guides of the supporting disk and are slidable radially. A ring spring is inserted into a recess in each centrifugal block. On the radially outer surface of each centrifugal block, relative to the supporting disk for centrifugal blocks, a piece of clutch lining is mounted. The driven disk is shaped as a cup with a through hole on the bottom. The drum of the small gear is set on the peripheral portion which is axially extending from the outer side of the driven disk bottom. The driven disk is ratably slipped on the extending axially flange of the supporting disk for centrifugal blocks and the small gear is in engagement with the large gear mounted on the output shaft of the clutch-transmission.

Wherein the auxiliary power means and the clutch-transmission may be fixed on the bicycle seat stays, and the second free-wheel and the bicycle free-wheel are situated on the same side of the rear wheel.

Alternatively, the auxiliary power means and the clutch-transmission may be fixed on the bicycle seat stays, with the second free-wheel and the bicycle free-wheel being situated on different sides of the rear wheel assembly.

In another alternate embodiment, the auxiliary power means and the clutch-transmission may be fixed on the rear luggage carrier of the bicycle, with the second free-wheel and the bicycle free-wheel being situated on the same side of the rear wheel.

In another alternate embodiment, the auxiliary power means and the clutch-transmission may be fixed on the rear luggage carrier of the bicycle, with the second free-wheel and the bicycle free-wheel being situated on different sides of the rear wheel separately.

In other alternate embodiments, the auxiliary power means and the clutch-transmission may be fixed on the bicycle steering tube, with the second free-wheel being situated on either side of the bicycle front wheel.

In yet another alternate embodiment, the auxiliary power means and the clutch-transmission may be fixed on the bicycle seat tube and down tube, with the second free-wheel being mounted on the crank axle of the bicycle.

Also, the bicycle may comprise a tricycle or a four-wheel cycle pedaled by manpower.

According to the present invention, the pedal bicycle with auxiliary power means is simple in structure, cheap in price, and easy to operate. The only thing that has to be done after starting the auxiliary power means (such as a small internal combustion engine) is to increase the rotating speed of the auxiliary power means to its optimum setting value. At that time, the centrifugal force exerted on the centrifugal blocks overcomes the elastic force of the ring spring, causing the centrifugal blocks to move out and the clutch lining situated on the outer surface of the centrifugal blocks to press closely to the inner surface of the cup of the driven disk. Thus, the power of the auxiliary power means can be transferred through the small gear on the supporting disk to the large gear on the output shaft of the clutch-transmission, with the power then being transmitted out from the output shaft. Because the driving direction of the second free-wheel is the same as that of the bicycle free-wheel, the affect for boosting the bicycle is achieved.

BRIEF DESCRIPTION OF THE DRAWINGS

The present invention will now be described in detail by means of several illustrative embodiments with reference to the accompanying drawings, wherein.

DESCRIPTION OF THE PREFERRED EMBODIMENTS

Figure 1:
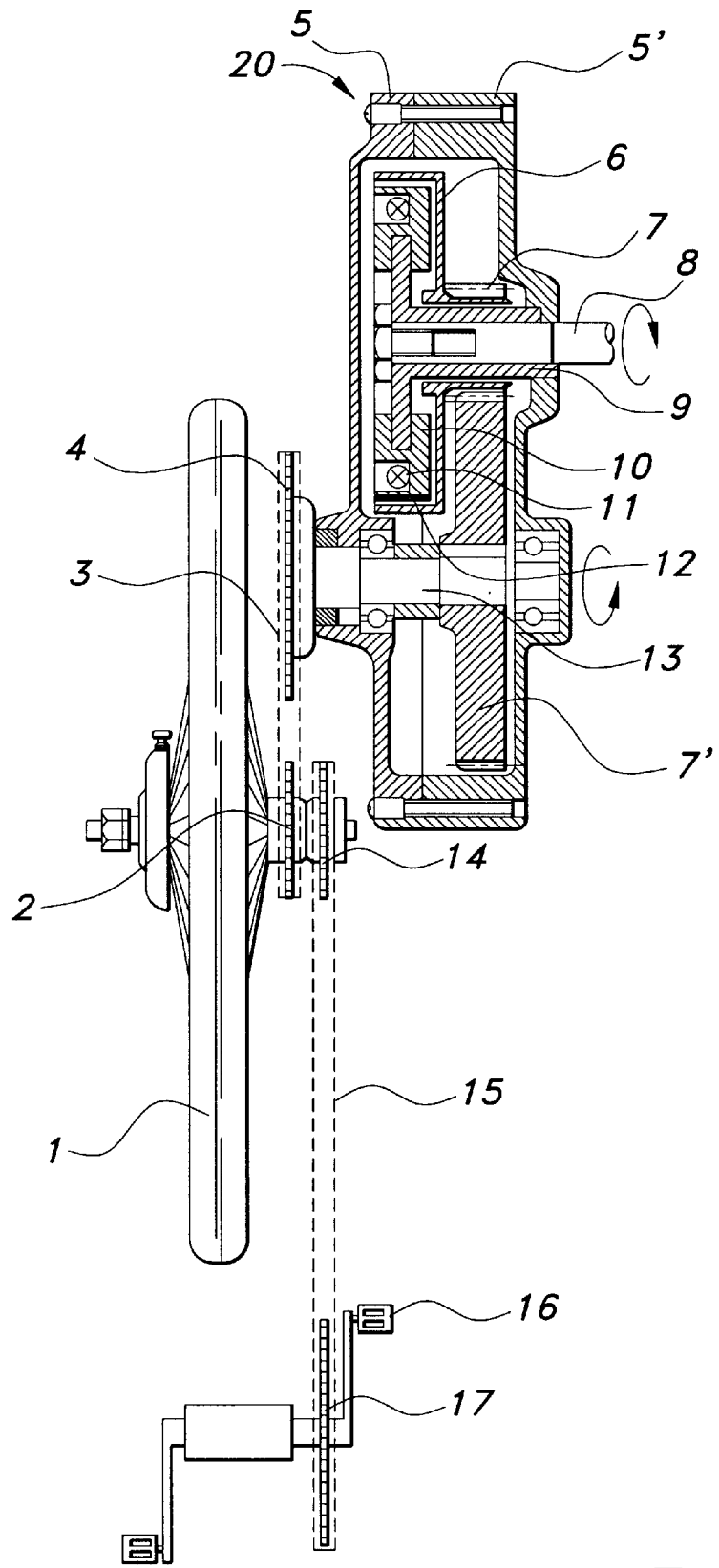
FIG. 1 is a schematic view of a transmission of a pedal bicycle in accordance with the present invention, in which the auxiliary power means is not shown.
Figure 2:
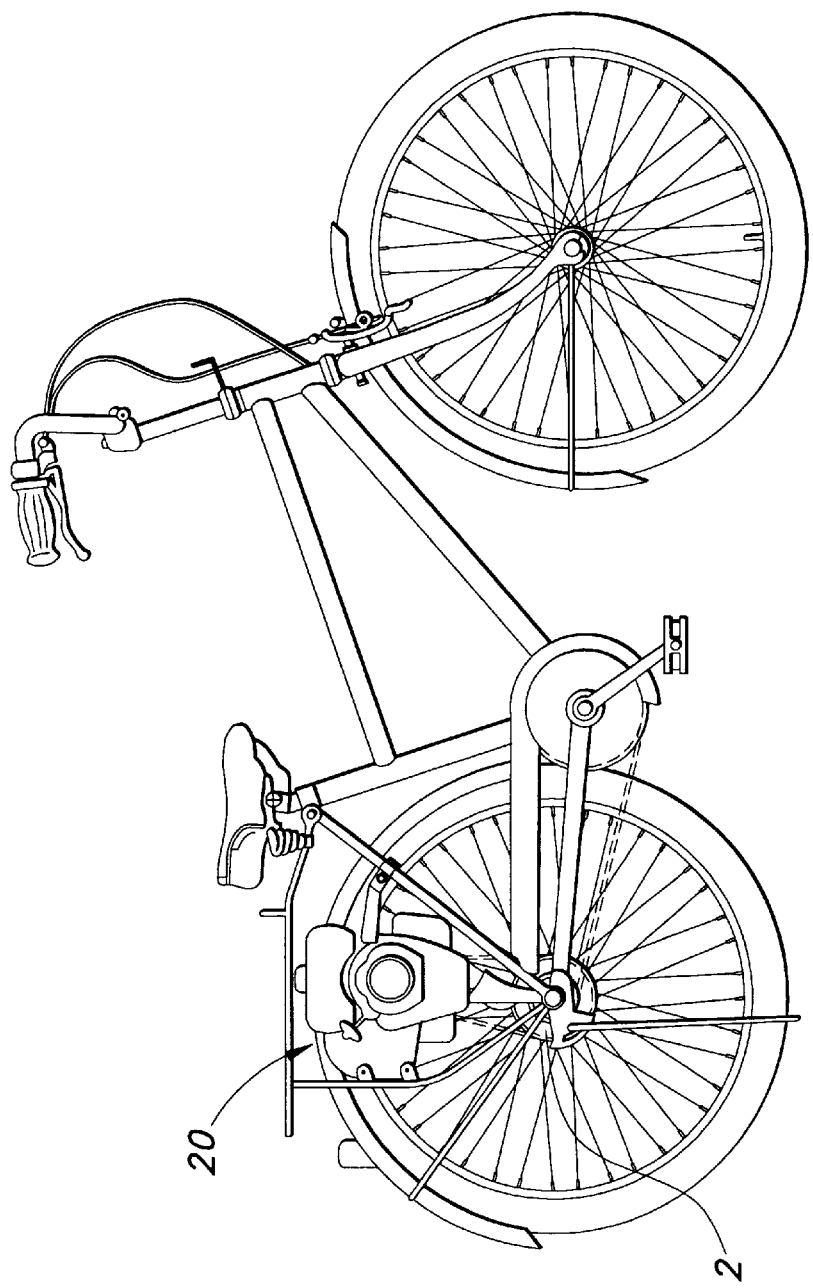
FIG. 2 is a general schematic view of the first embodiment of the pedal bicycle in accordance with the present invention.
Figure 7:
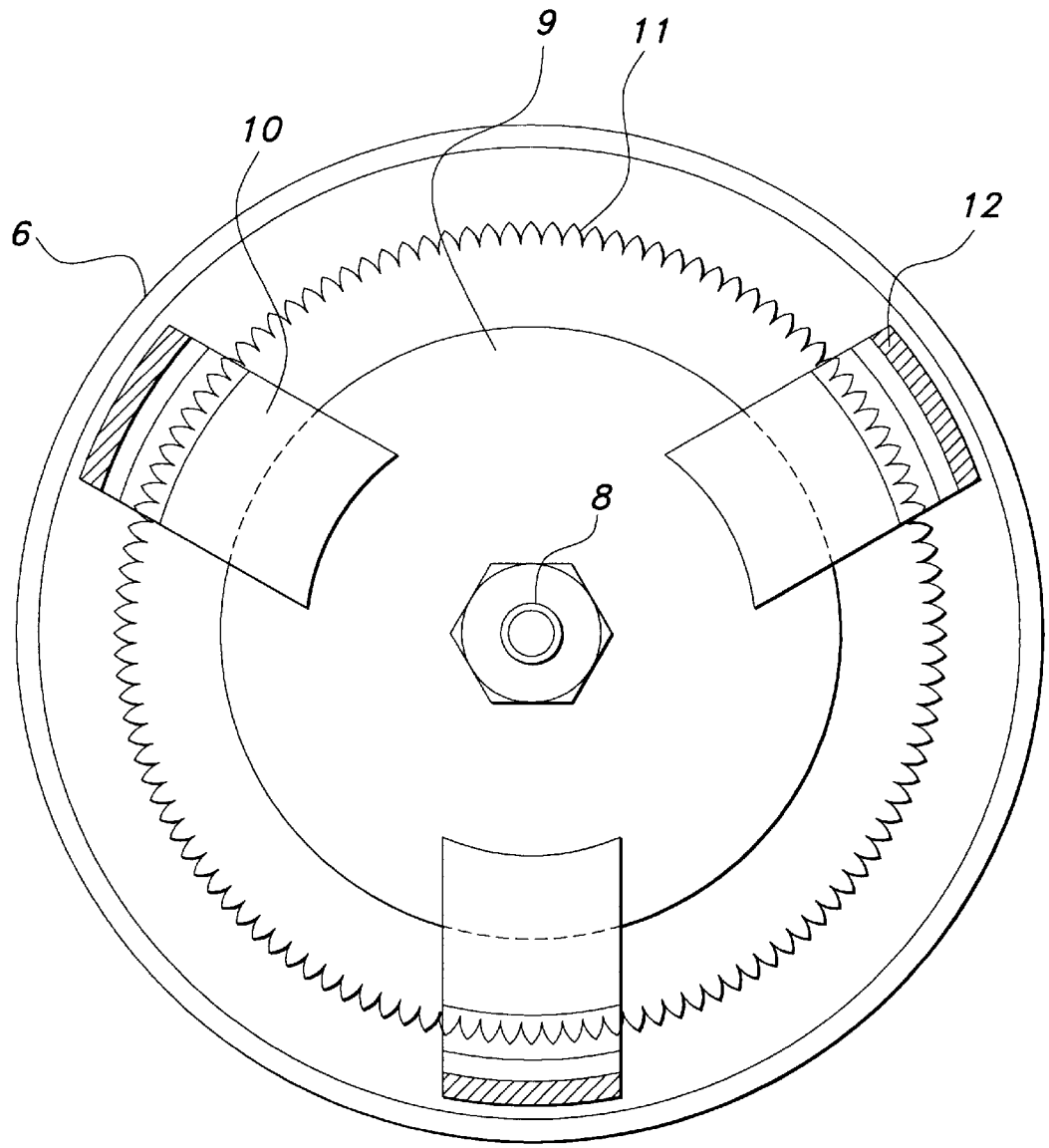
FIG. 7 is a partial schematic view of the clutch-transmission, in which the clutch part is shown.

FIGS. 1 and 2 show the transmission and the general arrangement for the first embodiment of a pedal bicycle having an auxiliary power means in accordance with the present invention. The pedal bicycle, besides the parts of a common bicycle, includes a second free-wheel 2, a second chain 3, second chain wheel 4 and a clutch-transmission 20. In this embodiment, the second free-wheel (ratchet) 2 and the bicycle free-wheel (ratchet) 14 are coaxially mounted on the same side of the rear hub of the bicycle and have the same driving direction. Moreover, the second chain 3 makes chain transmission between the second chain wheel 4 mounted on the output shaft 13 of the clutch-transmission 20 and the second free-wheel 2. Therefore, the power of the output shaft 13 can be transferred to the second free-wheel 2. The clutch-transmission 20 can be assembled with the auxiliary power means (not shown) into a whole, the clutch-transmission 20 has its case 5 and 5' connected by bolts, within which there are a supporting disk for centrifugal blocks 9, a driven disk 6, an input shaft 8 and a pair of speed-reducing helical gears, i.e., a small gear 7 and a large gear 7'. The supporting disk for centrifugal blocks 9 is connected to the input shaft 8 securely. The centrifugal blocks 10 are evenly slidable radially and are mounted on the guides of the supporting disk for centrifugal blocks 9 (see FIGS. 1 and 7). A ring spring 11 is inserted into the recess of each centrifugal block 10. On the radial outer surface of each centrifugal block 10 relative to the supporting disk for centrifugal blocks 9, a piece of clutch lining 12 is mounted. The shape of the driven disk 6 appears as a cup with a through hole on the bottom. The drum of the small gear 7 is set on the peripheral portion which is axially extending from the outer side of the bottom of the driven disk. The driven disk 6 is ratably slipped on the axially extending flange of the supporting disk for centrifugal blocks 9 and its cup covers the periphery of the centrifugal blocks 10. The small gear 7 is in engagement with the large gear 7' mounted on the output shaft 8.

In this embodiment, the auxiliary power means is a small internal combustion engine with a displacement of 25 cm$^3$, the internal combustion engine is manually started, and its throttle controller is connected to the grip of the bicycle through a cable. The auxiliary power means and the clutch-transmission 20 of this embodiment are fixed on the bicycle seat stays, and the second free-wheel 2 and the bicycle free-wheel 14 are situated on the same side of the rear hub of the bicycle (see FIG. 2).

When the auxiliary power means (the small internal combustion engine) has been started and accelerated to the predicted optimum rotating speed, for example 2700 r/min, the centrifugal force of the centrifugal blocks 10 overcomes the tension of the ring spring 11, causing the centrifugal blocks 10 to move out and enables the clutch lining 12 on blocks 10 to press closely to the inner surface of the cup of the driven disk 6, thereby rotating the driven disk 6. Through the engagement of the small gear 7 on the driven disk 6 with the large gear 7' on the output shaft 8, power is transmitted out from the output shaft 8 and causes the second chain wheel 4 on the output shaft 8 to rotate. As the second chain wheel 4 is connected to the second free-wheel 2 through the second chain 3, the second free-wheel 2 mounted on the hub of the bicycle wheel 1 is driven and rotates, thus a force is acted on the bicycle wheel 1. This force does not affect and hamper the drive of the bicycle free-wheel 14 which is pedaled by the manpower through the pedal 16 and the bicycle chain wheel 17 because of the same drive direction of the second free-wheel 2 and bicycle free-wheel 14. Regardless of whether the rotating speed of the second free-wheel 2 is larger or less that that of the bicycle free-wheel 14, the rotation of wheels 2 and 14 do not interfere with one another but instead supplement one another.

Figure 3:
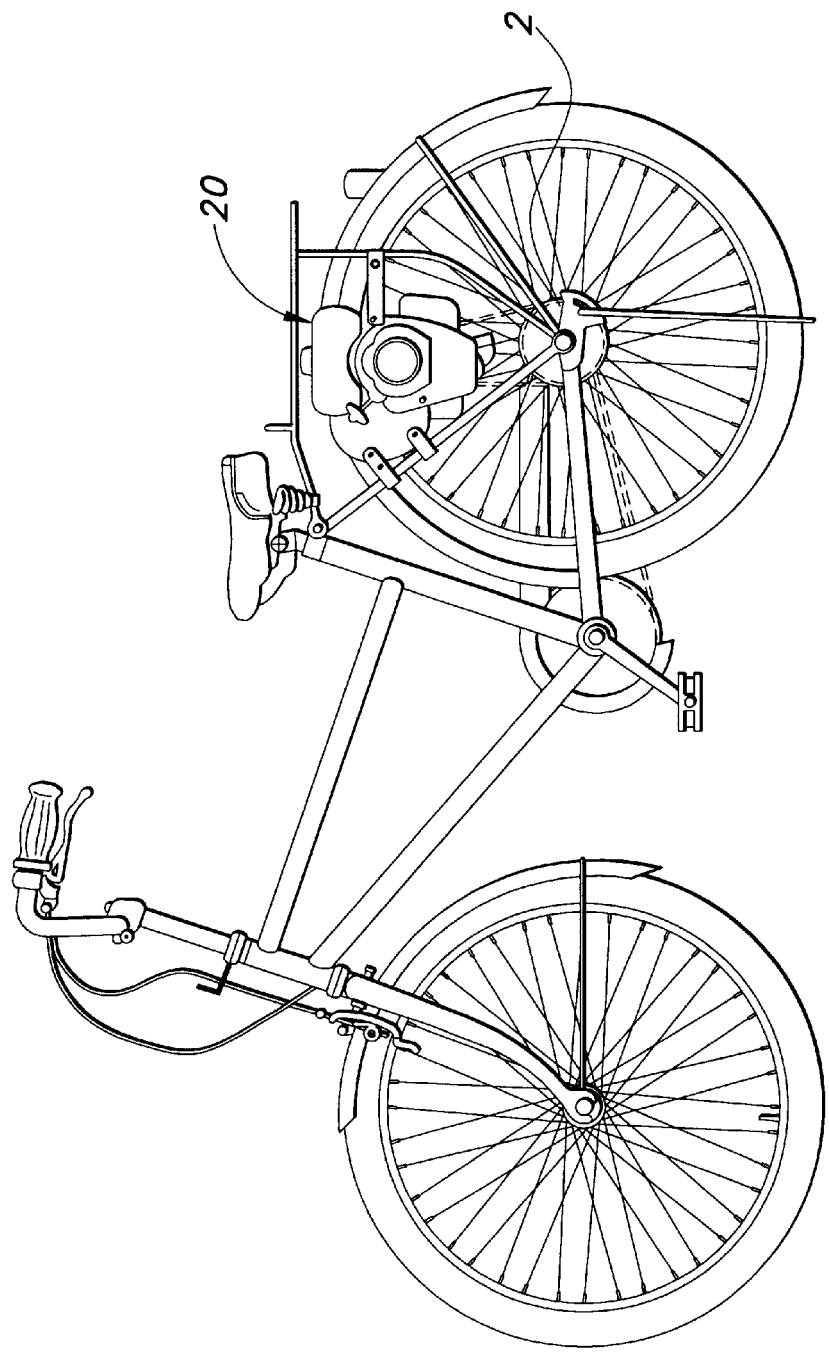
FIG. 3 is a general schematic view of a second embodiment of the pedal bicycle in accordance with the present invention.

In FIG. 3, a second embodiment of the pedal bicycle having an auxiliary power means in accordance with the present invention illustrated which is the same as the first embodiment except as noted. The only difference is that the second free-wheel 2 and the bicycle free-wheel 14 are situated on different sides of the rear wheel assembly.

Figure 4:
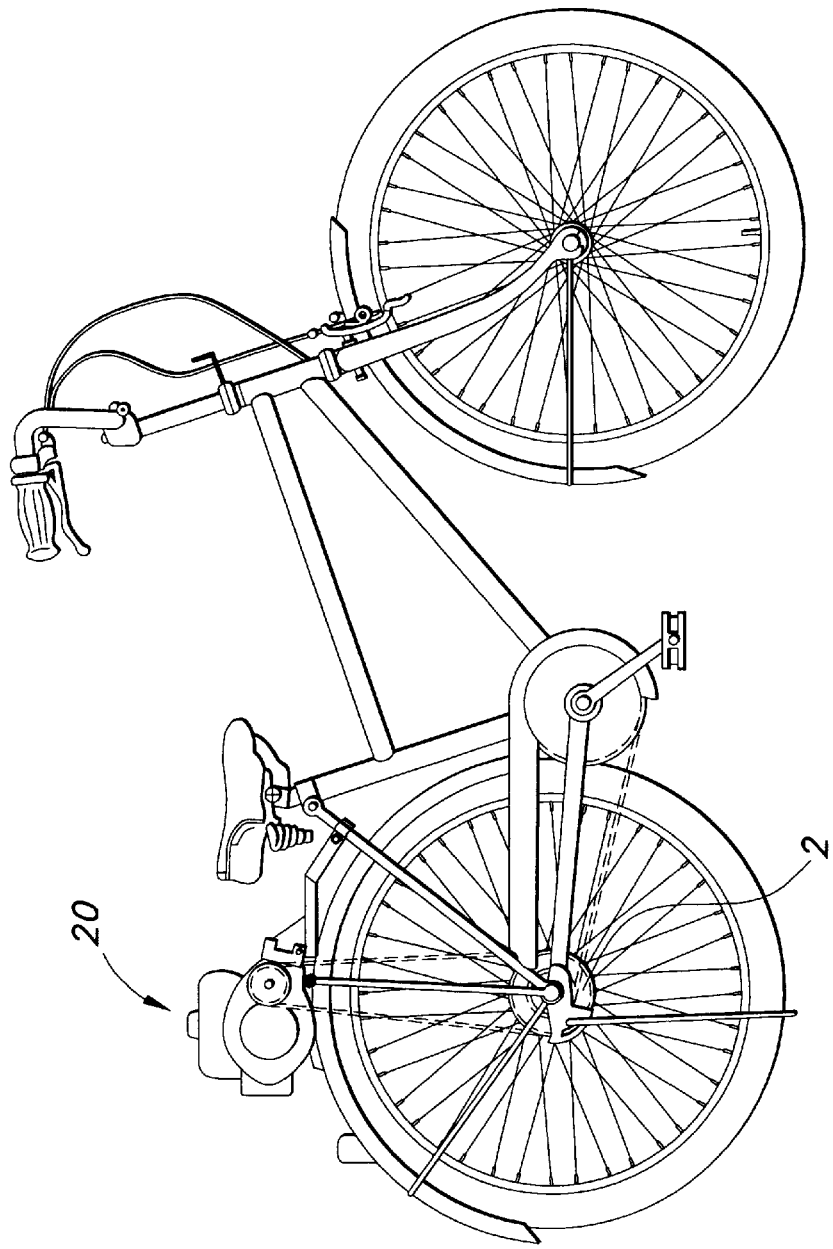
FIG. 4 is a general schematic view of a third embodiment of the pedal bicycle in accordance with the present invention.

FIG. 4 illustrates a third embodiment of the pedal bicycle having an auxiliary power means in accordance with the present invention which is the same as the first embodiment except as noted. The only differences are that auxiliary power means and the clutch-transmission 20 are fixed on the rear luggage carrier of the bicycle, and the second free-wheel 2 can be situated on either of the sides of the rear wheel 1.

Figure 5:
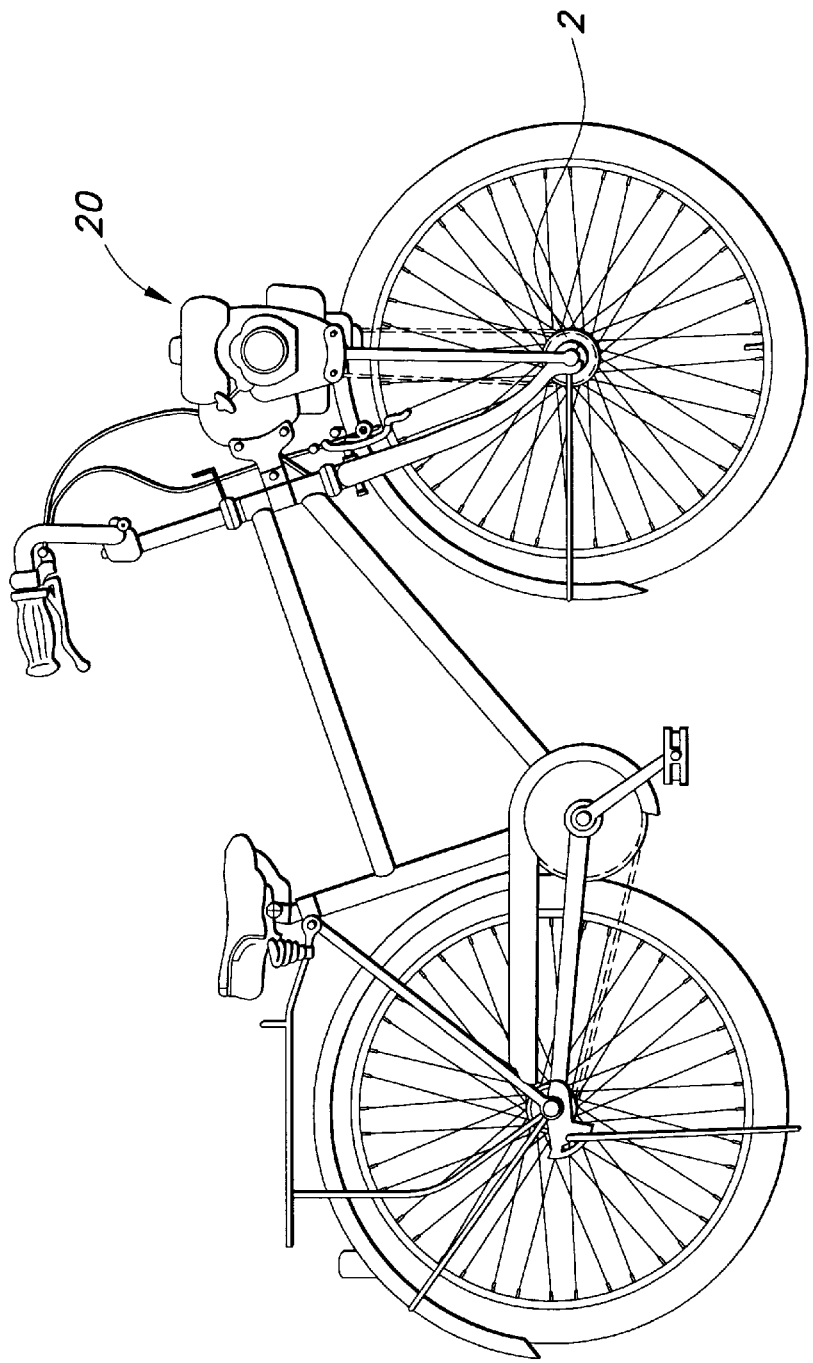
FIG. 5 is a general schematic view of a fourth embodiment of the pedal bicycle in accordance with the present invention.

FIG. 5 illustrates a fourth embodiment of the pedal bicycle having an auxiliary power means in accordance with the present invention which is the same as the first embodiment except as noted. The only differences are that the auxiliary power means and the clutch-transmission 20 are fixed on the steering tube, and the second free-wheel 2 may be situated on either of the sides of the front hub of the bicycle.

Figure 6:
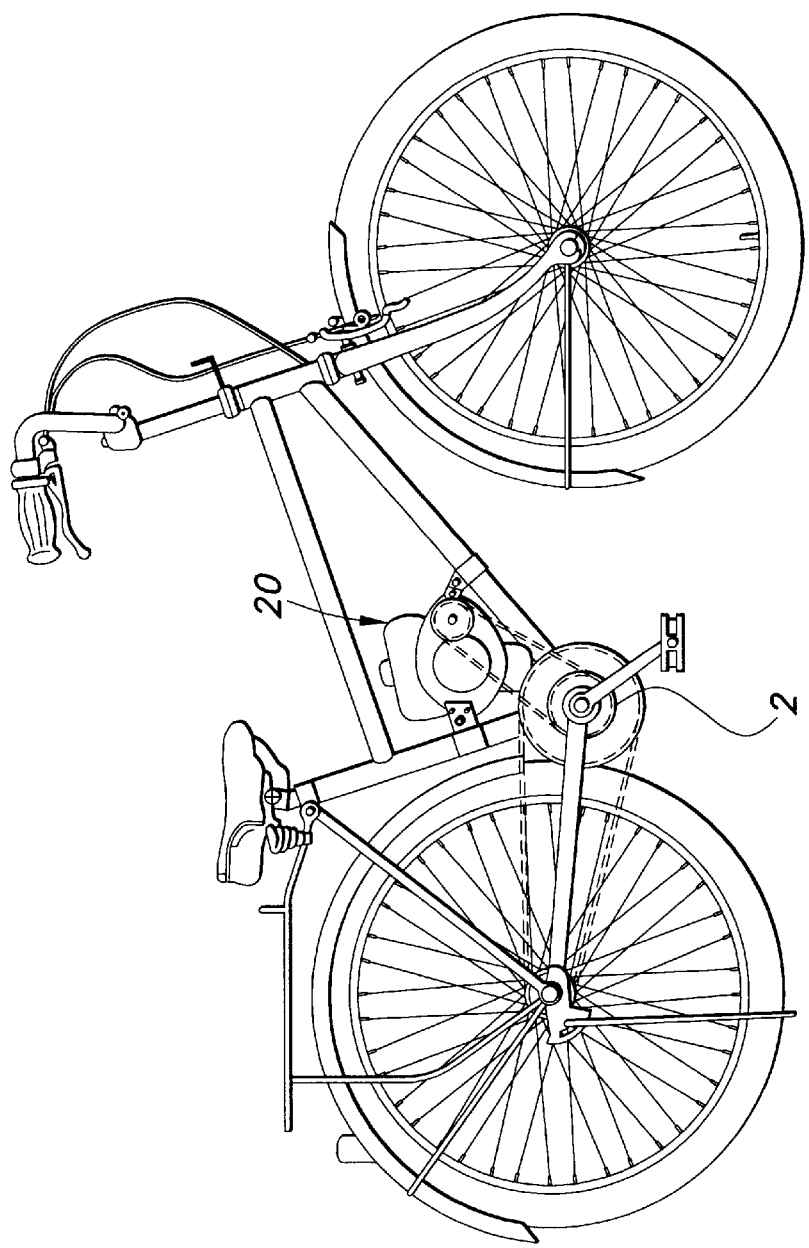
FIG. 6 is a general schematic view of a fifth embodiment of the pedal bicycle in accordance with the present invention, in which the second free-wheel is mounted on the crank axle of the bicycle coaxially with the bicycle chain wheel.

FIG. 6 illustrates a fifth embodiment of the pedal bicycle having an auxiliary power means in accordance with the present invention which is the same as the first embodiment except as noted. The only differences are that the auxiliary power means and the clutch-transmission 20 are fixed on the bicycle seat tube and down tube, and the second free-wheel 2 is mounted on the crank axle of the bicycle. When the auxiliary power means, as a booster, drives the bicycle, both of the rider's feet have to move simultaneously with the pedal. Obviously, the above-mentioned device can be used for a tricycle or four-wheel cycle pedaled by manpower.

INDUSTRIAL UTILIZATION

The pedal bicycle having an auxiliary power means in accordance with the present invention can be used as a riding means instead of walking, also as a means for transportation if it is adopted for pedaling a tricycle or four-wheel cycle. Evidently, it can be used as a means for games or amusement too.

What is claimed is:

1. A pedal-driven bicycle comprising:

an auxiliary power means with associated control;

a clutch-transmission including an output shaft on which a second chain wheel is mounted and further including an input shaft which interacts with an output shaft of the auxiliary power means;

a frame on which the auxiliary power means is fastened together with the clutch-transmission;

a first free-wheel which interacts with the pedals of the bicycle and is mounted on a rear hub of the bicycle; and a second free-wheel which is mounted on the rear hub of the bicycle and is connected to the second chain wheel via a second chain, with the clutch-transmission transmitting a chain drive onto the second chain; wherein the clutch-transmission includes a housing having first and second portions which are connected to one another, the clutch-transmission further including, located within the housing, the input shaft, a driven disk, a supporting disk which is firmly fastened to the input shaft, a plurality of centrifugal blocks, and a pair of speed-reducing gears comprising a small gear and a large gear;

the centrifugal blocks are distributed uniformly over the circumference of the supporting disk and are mounted so as to slide radially on guides of the supporting disk, with an annular spring being admitted into a recess of each centrifugal block, the clutch-transmission further including a clutch lining mounted on a radially exterior, relative to the supporting disk, surface of each centrifugal block; and the driven disk is bowl shaped with an exterior area which extends axially from an outer side of a bottom of the driven disk and is provided with a passage hole, whereby the small gear is applied to the axially exterior area of the driven disk and the driven disk is placed rotatively on a flange of the supporting disk which extends axially, and the bowl of the driven disk encompasses an edge of the centrifugal blocks, whereby the small gear engages with the large gear which is mounted on the output shaft of the clutch-transmission.

2. The pedal-driven bicycle according to claim 1 in which the auxiliary power means and the clutch-transmission are fastened on the bicycle seat support and the second free-wheel and the free-wheel of the bicycle are arranged on the same side of the rear wheel.

3. The pedal-driven bicycle according to claim 1 in which the auxiliary power means and the clutch-transmission are fastened to the bicycle seat support, with the second free-wheel and the free-wheel of the bicycle being arranged on different sides of the rear wheel.

4. The pedal-driven bicycle according to claim 1 in which the auxiliary power means and the clutch-transmission are fastened on the rear luggage carrier of the bicycle and the second free-wheel and the free-wheel of the bicycle are arranged on the same side of the rear wheel.

5. The pedal-driven bicycle according to claim 1 in which the auxiliary power means and the clutch-transmission are fastened on the rear luggage carrier of the bicycle and the second free-wheel and the free-wheel of the bicycle are arranged on different sides of the rear wheel.

6. The pedal-driven bicycle according to claim 1 in which the auxiliary power means and the clutch-transmission are fastened on the handlebars of the bicycle, with the second free-wheel being arranged on one side of the front wheel.

7. The pedal-driven bicycle according to claim 1 in which the auxiliary power means and the clutch-transmission are fastened on the seat tube of the bicycle and the front support tube, with the second free-wheel being arranged on the bottom bracket of the bicycle.

8. The pedal-driven bicycle according to claim 1 in which the cycle is a tricycle or a quadricycle which is moved by human power.

* * * * *